United States Patent [19]
Anderson

[11] 3,964,667
[45] June 22, 1976

[54] DIFFUSION BONDING

[75] Inventor: Robert C. Anderson, Oak Ridge, Tenn.

[73] Assignee: The United States of America as represented by the United States Energy Research and Development Administration, Washington, D.C.

[22] Filed: Jan. 19, 1966

[21] Appl. No.: 521,747

[52] U.S. Cl. .............................. 228/194; 228/221; 228/234
[51] Int. Cl.² ......................................... B23K 31/02
[58] Field of Search ........... 29/497.5, 498; 228/194, 228/221, 234

[56] References Cited
UNITED STATES PATENTS
3,478,416  11/1969  Hamilton ............................ 228/194

Primary Examiner—Benjamin R. Padgett
Assistant Examiner—B. H. Hunt
Attorney, Agent, or Firm—Dean E. Carlson; David S. Zachry

EXEMPLARY CLAIM

1. A method for joining beryllium to beryllium by diffusion bonding, comprising the steps of coating at least one surface portion of at least two beryllium pieces with nickel, positioning a coated surface portion in a contiguous relationship with an other surface portion, subjecting the contiguously disposed surface portions to an environment having an atmosphere at a pressure lower than ambient pressure, applying a force upon the beryllium pieces for causing the contiguous surface portions to abut against each other, heating the contiguous surface portions to a maximum temperature less than the melting temperature of the beryllium, substantially uniformly decreasing the applied force while increasing the temperature after attaining a temperature substantially above room temperature, and maintaining a portion of the applied force at a temperature corresponding to about maximum temperature for a duration sufficient to effect the diffusion bond between the contiguous surface portions.

10 Claims, No Drawings

DIFFUSION BONDING

The invention described herein was made in the course of, or under, a contract with the U.S. Atomic Energy Commission.

This invention relates generally to diffusion bonding, and more particularly to a method of joining beryllium to beryllium by diffusion bonding.

The previously practiced techniques for bonding or joining beryllium to beryllium have not been capable of providing bonds of desirable quality from the standpoints of tensile strength and other properties. These shortcomings or drawbacks are primarily due to the physical and mechanical properties of beryllium metal which inhibits or renders difficult the establishment of a suitable bond between beryllium pieces.

Of these shortcomings or drawbacks, structural homogeneity is, perhaps, the major area of concern in beryllium welding or bonding technology. For example, should the bond between beryllium pieces possess a tensile strength less than that of the parent beryllium metal, then any structural applications of the bonded beryllium structure would necessarily be limited to applications amenable with the weaker strength values afforded by the bond.

Other shortcomings or drawbacks which may be encountered result from the introduction of foreign elements in the bond area of the beryllium structure such as to impair the usage of the beryllium structure in a nuclear environment where the nuclear properties of beryllium are of major importance. For example, in nuclear reactor or related applications, the inclusion of materials having relatively high neutron capture cross sections in the bond area would detract from the overall usefulness of the beryllium structure from a nuclear property standpoint. Also, in other applications where beryllium is used because of its desirable nuclear properties, such as, for example, picture windows for X-ray tubes, the inclusion of materials of relatively high atomic number in the bond area may impose some problems.

Of the various techniques for welding or bonding beryllium, diffusion bonding and braze welding with appropriate fluxes and/or brazing material have been widely accepted. Diffusion bonding may be preferable as a means for joining beryllium pieces in that the introduction of foreign elements or materials into the joint may be kept at a minimum for nuclear reasons. Also, such foreign elements may alloy with the beryllium or otherwise combine therewith to produce a joint having a tensile strength less than anticipated or desired. Further, and perhaps most importantly, joints connecting beryllium pieces that have been produced by diffusion bonding have been found to provide tensile strengths more closely approaching the tensile strength of the parent beryllium metal than joints provided by practicing other welding techniques.

Diffusion bonding has been accomplished by holding pieces of beryllium together (with or without an other material, e.g., aluminum, between the faying surfaces of the beryllium pieces) under the influence of pressure and at a temperature below the melting point of the beryllium. The bond or weld joining the beryllium pieces may thereby be effected through plastic flow, recrystallization, and/or grain coalescence across the interface between the beryllium pieces.

Joints between beryllium pieces established by diffusion bonding methods as previously known are divided into several categories of tensile strength. For example, with the parent beryllium metal providing the beryllium pieces to be joined having a tensile strength of about 48,000 pounds per square inch (psi) as provided by known powder metallurgy techniques, joints of the following tensile strengths have been obtained: Beryllium-to-beryllium diffusion bonds obtained without an additive at the interface between the beryllium pieces have been found to possess tensile strengths of about 25,000 psi. The addition of a thin aluminum layer of about 0.005 of an inch thickness on the faying surfaces of the beryllium pieces increases the tensile strength of the joint to about 36,500 psi. However, even with the relatively high tensile strength provided by the latter joint, the structural usefulness of the bonded beryllium structure is necessarily limited to only about 80 percent of its potential.

In addition to the insufficient tensile strengths obtained by practicing previously known diffusion bonding techniques, another drawback encountered by practicing the latter is that relatively high pressures are required to maintain the faying surfaces in abutting relationship during the establishment of the bond. These high pressures may distort the beryllium metal to such an extent as to necessitate machining or reforming operations to obtain the desired structural configuration. Also, if the dimensions or tolerances of the beryllium structure are critical the distortion or deformation of the structure due to the use of the previously required high pressures, the structure may be affected in such a manner as to be outside of the desired dimensions or tolerances.

The present invention aims to obviate or substantially minimize the above and other shortcomings or drawbacks by providing a new and improved beryllium-to-beryllium bond which possesses a tensile strength equaling or exceeding the tensile strength of the parent beryllium metal even when using beryllium having a tensile strength of about 48,000 psi. This improved bond is obtained by practicing a novel diffusion bonding method which, in general, comprises the coating of at least one of the faying surfaces of the beryllium pieces with a thin layer of nickel and thereafter maintaining these surfaces in an abutting relationship during a heating and pressure-application cycle. This cycle utilizes varying temperatures and pressures having an inverse relationship. In other words, as the applied pressure is decreased the temperature is increased.

The beryllium joining bond provided by the novel method of the present invention is also advantageous in nuclear environments where the nuclear properties of beryllium are of significant importance, since the quantity of undesirable foreign elements introduced into the bond is minimal and since both the neutron capture cross section and atomic number of nickel are relatively low.

An object of the present invention is to provide a new and improved diffusion bonding method for joining beryllium to beryllium.

Another object of the present invention is to provide a novel diffusion bonding method wherein nickel is disposed at the interface of the beryllium pieces to be joined for effecting and facilitating the establishment of a bond.

Another object of the present invention is to provide a novel diffusion bonding method wherein an inverse relationship is provided between variations in the applied pressures and temperatures during the bonding operation.

A further object of the present invention is to provide a new and improved bond for joining beryllium to beryllium.

A further object of the present invention is to provide a beryllium-to-beryllium bond having a tensile strength equaling or exceeding that of the parent beryllium.

A still further object of the present invention is to provide a beryllium-to-beryllium bond wherein the presence of foreign elements possessing deleterious nuclear properties is minimal when the nuclear properties of the joined beryllium is of major importance.

Other and further objects of the invention will be obvious upon an understanding of the illustrative embodiment about to be described, or will be indicated in the appended claims, and various advantages not referred to herein will occur to one skilled in the art upon employment of the invention in practice.

As briefly described above, the present invention provides beryllium-to-beryllium bonds having tensile strengths equal to or greater than the tensile strengths of the parent beryllium metal. These exceptionally strong beryllium joints are obtained by practicing the novel diffusion bonding method of the present invention. Generally, this method comprises providing the edges or the fay surfaces of the beryllium pieces or components to be joined with smooth surfaces and thereafter covering at least one of these surfaces with a very thin coating of nickel in any suitable manner, e.g., electroplating, nickel bath, etc. The thickness of this nickel coating has been found to be critical with respect to the tensile strength of the joint as will be discussed in detail below. The beryllium pieces, or at least portions thereof including the nickel coated faying surfaces of the beryllium pieces, may be placed in an evacuated chamber and then a selected force applied through suitable fixtures to the beryllium pieces to maintain the latter in an abutting relationship. This force, which corresponds to a pressure application, is preferably variable through the bonding cycle from a maximum pressure of about 1100 to about 2200 psi to a minimum pressure of about 125 to about 250 psi. While the applied pressure or force is in its maximum range the fixture-held beryllium pieces are heated from room temperature up to a temperature of about 650°C., after which the applied pressure is decreased as the temperature is increased to about 800°C. to about 900°C.

The beryllium pieces are maintained or held in the abutting relationship under the influence of pressure in the lower or minimum range while being subjected to a temperature of between about 800°C. to about 900°C. for a preselected time to assure the establishment of the bond between the beryllium pieces.

Described in greater detail, the method of diffusion bonding unique with the present invention may be practiced in a manner believed best illustrated by describing typical bonding operations.

The beryllium pieces to be joined are initially prepared for bonding by grinding or otherwise smoothing each beryllium surface or edge to be incorporated in the joint to a flatness of about five-millionths of an inch, i.e., five microinches, with the surface being essentially scratch-free; i.e., imperfections such as ridges or valleys having dimensions no greater than about four microinches should be present in this prepared beryllium surface. The prepared beryllium edges or surfaces and portions adjacent thereto may be degreased or cleaned to assure that contaminants, such as, for example, those resulting from the surface smoothing operation, handling, or other sources, are substantially removed. This cleaning operation may be achieved by utilizing methylchloroform or any other suitable cleansing agent.

In order to effect the diffusion bond between beryllium pieces that possesses a tensile strength greater than previously obtainable, a quantity of nickel is disposed between the surfaces of the beryllium to be joined together. Upon being subjected to the pressures and temperatures present during the diffusion bonding operation, the nickel and portions of the beryllium adjacent thereto become somewhat plastic and flow together to effect diffusion of the nickel into the beryllium. This diffusion, in turn, provides alloying or grain coalescence across the interface of the nickel and the beryllium so as to achieve the desired diffusion bonding or joining between the beryllium pieces.

The nickel is preferably placed between the beryllium pieces by covering at least one of the surfaces of the beryllium pieces to be involved in the bond with a coating or layer of the nickel. Such coating is preferably provided by practicing a suitable electroplating procedure which is capable of depositing on each beryllium piece a nickel coating or plate having a uniform thickness of about 2.5 microinches. Or, if desired, one of the two beryllium surfaces to be joined together may be provided with a coating about 5 microinches in thickness while the surface of the other beryllium piece remains in its "as-lapped" condition, i.e., free of nickel. This thickness of the nickel coating has been found to be critical in that with coatings of thicknesses greater or less than about 2.5 microinches on each beryllium piece, or, in other words, a total thickness of about 5 microinches on one or both the surfaces of the beryllium pieces being joined, the tensile strength of the joint is reduced. For example, with nickel layers on one or both beryllium pieces having a total thickness of about 2 microinches, the tensile strength of the joint is about 25 percent less than that obtained with the 5-microinch nickel. With nickel layers having a total thickness of about 15 microinches, the tensile strength is reduced about 12 percent. Furthermore, with nickel layers having total thicknesses greater than 15 microinches, the tensile strength is even further reduced. Consequently, a joint achieved with nickel layers having a total thickness of about 5 microinches has a tensile strength of about 48,000 psi, whereas other joints achieved with nickel layers having total thicknesses of about 2 microinches and 15 microinches respectively possess tensile strengths of about 33,000 psi and 42,000 psi.

When at least one of the beryllium pieces is provided with a nickel coating of desired thickness, the coated or plated surface or surfaces may be juxtapositioned in a suitable fixture or mechanism which is capable of holding the faying surfaces in abutting alignment under the influence of a pressure loading.

The beryllium pieces may be placed in a suitable chamber or vessel (either before or after the beryllium pieces are secured in the fixture) which may be evacuated to a vacuum of about $9 \times 10^{-5}$ of a millimeter (mm) mercury or even a higher vacuum. After achieving the vacuum or at any other suitable time, a force corresponding to a pressure of about 1100 to about 2200 psi may be applied to the beryllium pieces through the fixture to force the faying surfaces together. During the evacuation of the chamber and/or the application of the pressure, or again, at any other suitable time, the contents of the chamber, which include at least the fay surfaces of the beryllium pieces, may be heated from room temperature up to a maximum temperature between about 800°C. to about 900°C. This heating of the chamber contents may be provided in any suitable manner, such as, for example, induction heating. However, such heating is preferably closely controllable so as not to subject the chamber contents to relatively rapid temperature increases while at the same time providing both an essentially uniform rise in temperature and a capability of holding or maintaining the chamber contents at a selected temperature for a desired time period or duration. The maintenance of the temperature for this timed period provides a holding period during which the combined influence of the heat and pressure effects or aids in effecting the desired diffusion bonding of the beryllium pieces. The effect this holding period has upon the bond will be discussed in greater detail below.

After the temperature is increased from room temperature up to about 650°C., the applied pressure is reduced such that when the temperature is further increased to a temperature between about 650°C. and 675°C. the pressure has been uniformly decreased from about 1100 to about 2200 psi down to about 625 to about 1250 psi. This relationship, i.e., an inverse relationship, of increasing temperature to decreasing pressure is maintained throughout the portion of the bonding cycle corresponding to the temperature increase up to about 800°C. to about 900°C., and a pressure drop from about 1100 to 2200 psi down to about 125 to about 250 psi. This inverse relationship between the temperature and pressure is more clearly illustrated in the following table which sets forth two temperature-pressure cycles that have been found to be satisfactory for joining beryllium pieces by diffusion bonding at different holding temperatures. The values indicated in the table for the temperatures and pressures are given for illustrative purposes and are not necessarily precise or exact, since slight departures from the listed values may be experienced while still obtaining satisfactory joints by diffusion bonding.

TABLE

| Temperature (°C.) | Pressure (psi) A* | B** |
| --- | --- | --- |
| Room temp. to 650 | 1100 to 2200 | 1100 to 2200 |
| 650–675 | 625 to 1250 | 625 to 1250 |
| 675–700 | 400 to 800 | 400 to 800 |
| 700–750 | 300 to 600 | 300 to 600 |
| 750–800 | 125 to 250 | 200 to 400 |
| 800–850 | 125 to 250 (hold) | 125 to 250 |
| 850–900 | | 125 to 250 (hold) |

*825°C. hold temperature
**875°C. hold temperature

As generally shown in the above table, the holding temperature may be selected from a range of temperatures extending from about 800°C. to about 900°C. with the applied pressure or holding pressure being maintained at about 125 to about 250 psi. The holding temperature is preferably maintained for at least about 15 minutes. Holding times longer than about 15 minutes have been found to be unnecessary. During this holding period the beryllium and the nickel are able to complete an alloying effect for assuring the attainment of the desired diffusion bond. Diffusion bonding is achieved by atoms of beryllium and nickel moving or transferring across the interface between the beryllium pieces. Nickel is partially soluble in beryllium as to form a solid solution for facilitating the transfer of the atoms across the interface. Also, as the result of such atom transfer, the interface is substantially, if not entirely, eliminated. The elevated or the high temperatures used during the holding period provide for greater atom motion than obtainable at lower temperatures.

Upon completion of the holding period, the chamber heating mechanism may be inactivated to allow the chamber contents to cool. However, in order to assure that a desired bond is achieved, the indicated holding pressure is preferably maintained through at least a substantial portion of the cooling period. Normally, this cooling period is maintained until the chamber contents have cooled to about room temperature.

It will be seen that the present invention sets forth a new and improved beryllium-to-beryllium bonding method and bond which provide a significant advancement in beryllium welding or bonding technology. The beryllium-to-beryllium bonds effected by the present method have been found to possess tensile strengths exceeding the tensile strengths of the parent beryllium metal even when the tensile strength of the latter is as much as 48,000 psi. For example, bonds or joints possessing tensile strengths exceeding 48,800 psi have been obtained.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A method for joining beryllium to beryllium by diffusion bonding, comprising the steps of coating at least one surface portion of at least two beryllium pieces with nickel, positioning a coated surface portion in a contiguous relationship with an other surface portion, subjecting the contiguously disposed surface portions to an environment having an atmosphere at a pressure lower than ambient pressure, applying a force upon the beryllium pieces for causing the contiguous surface portions to abut against each other, heating the contiguous surface portions to a maximum temperature less than the melting temperature of the beryllium, substantially uniformly decreasing the applied force while increasing the temperature after attaining a temperature substantially above room temperature, and maintaining a portion of the applied force at a temperature corresponding to about maximum temperature for a duration sufficient to effect the diffusion bond between the contiguous surface portions.

2. A method of joining beryllium to beryllium by diffusion bonding as claimed in claim 1, wherein the nickel coating is on only one of the contiguous beryllium surface portions with said coating having an essentially uniform thickness of about 5 microinches.

3. A method of joining beryllium to beryllium by diffusion bonding as claimed in claim 1, wherein the nickel coating is on each of the contiguous beryllium surface portions with each coating having an essentially uniform thickness of about 2.5 microinches.

4. A method of joining beryllium to beryllium by diffusion bonding as claimed in claim 1, including the additional step of providing the contiguous beryllium surface portions which are abutted against each other with essentially smooth and flat surfaces prior to application of the nickel coating.

5. A method for joining beryllium to beryllium by diffusion bonding as claimed in claim 1, wherein the applied force prior to the attainment of the temperature substantially above room temperature corresponds to a pressure of about 1100 psi to about 2200 psi, and wherein the maintained applied force corresponds to a pressure of about 125 psi to about 250 psi.

6. A method for joining beryllium to beryllium by diffusion bonding as claimed in claim 1, wherein the temperature substantially above room temperature is about 650°C., the temperature below the melting point of beryllium is between about 800°C. and about 900°C., and wherein the maintained temperature is a temperature selected from a range of temperatures between about 800°C. and about 900°C.

7. A method for joining beryllium to beryllium by diffusion bonding as claimed in claim 6, wherein the applied force prior to the attainment of the temperature substantially above room temperature corresponds to a pressure of about 1100 psi to about 2200 psi, and wherein the maintained applied force corresponds to a pressure of about 125 psi to about 250 psi.

8. A method for joining beryllium to beryllium by diffusion bonding as claimed in claim 7, wherein said duration sufficient to effect the diffusion bonding is for a time period of at least about 15 minutes.

9. A method of joining beryllium to beryllium by diffusion bonding as claimed in claim 8, wherein the pressure lower than ambient pressure corresponds to a vacuum of at least about $9 \times 10^{-5}$ millimeters of mercury.

10. A method for joining beryllium to beryllium by diffusion bonding as claimed in claim 8, including the additional steps of terminating the heating of the contiguous surface portions at the end of said time period to effect cooling of the contiguous surface portions, and holding the maintained applied force throughout at least a portion of the cooling.

* * * * *